(12) United States Patent
Guo

(10) Patent No.: US 11,566,824 B2
(45) Date of Patent: Jan. 31, 2023

(54) DISTRIBUTOR, FALL FILM EVAPORATOR AND REFRIGERATION SYSTEM

(71) Applicant: Carrier Corporation, Palm Beach Gardens, FL (US)

(72) Inventor: Junjie Guo, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 228 days.

(21) Appl. No.: 16/756,693

(22) PCT Filed: Oct. 12, 2018

(86) PCT No.: PCT/US2018/055622
§ 371 (c)(1),
(2) Date: Apr. 16, 2020

(87) PCT Pub. No.: WO2019/079122
PCT Pub. Date: Apr. 25, 2019

(65) Prior Publication Data
US 2020/0340721 A1 Oct. 29, 2020

(30) Foreign Application Priority Data
Oct. 18, 2017 (CN) .......................... 201710969449.2

(51) Int. Cl.
*F25B 39/00* (2006.01)
*F25B 39/02* (2006.01)

(52) U.S. Cl.
CPC .... *F25B 39/028* (2013.01); *F25B 2339/0242* (2013.01)

(58) Field of Classification Search
CPC ........ F28D 9/005; F28D 21/0017; F28D 7/00; F28D 7/1607; F28D 3/02; F28D 3/04;
(Continued)

(56) References Cited

U.S. PATENT DOCUMENTS 4,524,823 A * 6/1985 Hummel ................. F28F 9/028
165/174
6,868,695 B1 * 3/2005 Dingel .................. F28F 9/0278
62/515
(Continued)

FOREIGN PATENT DOCUMENTS

CN 102020389 A 4/2011
CN 104399265 A 3/2015
(Continued)

OTHER PUBLICATIONS

International Search Report for application PCT/US2018/055622, dated Jan. 25, 2019, 13 pages.
(Continued)

*Primary Examiner* — Harry E Arant
(74) *Attorney, Agent, or Firm* — Cantor Colburn LLP

(57) ABSTRACT

A distributor (100), a falling film evaporator and a refrigerating system. The distributor includes: a sprayer (110), the top of the sprayer being connected to a falling film evaporator inlet (230), and the bottom of the sprayer being provided with spray holes (111); and an orifice plate (120) disposed at a lower end of the sprayer and provided with multiple distribution holes (121), wherein a centrifugal gas-liquid separating element is disposed in the sprayer and is configured to separate a refrigerant entering the sprayer through the evaporator inlet into a gas phase and a liquid phase. In the distributor, the centrifugal gas-liquid separating element is disposed in the sprayer, so that a two-phase refrigerant entering the sprayer through the evaporator inlet can be better separated under dual effects of the gravity and the centrifugal force.

12 Claims, 3 Drawing Sheets

(58) Field of Classification Search
CPC ............ F25B 39/028; F25B 2339/0242; F25B 39/02; B01D 1/16; B01D 1/04; F28F 1/006
See application file for complete search history.

(56) References Cited

U.S. PATENT DOCUMENTS

| | | | |
|---|---|---|---|
| 2013/0277019 A1* | 10/2013 | Numata | F25B 39/02 165/157 |
| 2015/0013950 A1 | 1/2015 | Numata et al. | |
| 2016/0298890 A1* | 10/2016 | Esformes | B01D 19/0057 |

FOREIGN PATENT DOCUMENTS

| | | |
|---|---|---|
| CN | 104955795 A | 9/2015 |
| CN | 204830588 U | 12/2015 |
| GB | 2021426 A | 12/1979 |
| WO | 2016191417 A1 | 12/2016 |

OTHER PUBLICATIONS

Chinese Office Action for Application No. 201710969449.2; dated Jul. 1, 2021; 13 Pages.

* cited by examiner

US 11,566,824 B2

DISTRIBUTOR, FALL FILM EVAPORATOR AND REFRIGERATION SYSTEM

TECHNICAL FIELD

The present invention relates to the field of refrigeration, and in particular, the present invention relates to a distributor having a falling film evaporator.

BACKGROUND ART

Compared with a conventional shell-and-tube evaporator such as a flooded evaporator or a dry evaporator, a falling film evaporator is mainly advantageous in a relatively low refrigerant charge quantity and higher heat transfer efficiency. In order to implement the foregoing effects, such falling film evaporators in the existing design generally have a complex distributor structure to achieve a better gas-liquid separation effect and uniform distribution of a liquid-phase refrigerant. The complex structure further results in increased manufacturing costs of parts. It is necessary to reduce the structure design difficulty and manufacturing costs of falling film evaporators in order to enhance the applicability of the falling film evaporators. Therefore, how to balance the refrigeration performance and the product costs becomes an urgent technical problem to be solved in this field.

SUMMARY OF THE INVENTION

The present invention is aimed at providing a distributor, a falling film evaporator and a refrigerating system, so as to improve a gas-liquid separation effect of a refrigerant, thereby providing refrigeration performance.

According to an aspect of the present invention, a distributor is provided. The distributor includes: a sprayer, the top of the sprayer being connected to a falling film evaporator inlet, and the bottom of the sprayer being provided with spray holes; and an orifice plate disposed at a lower end of the sprayer and provided with multiple distribution holes, wherein a centrifugal gas-liquid separating element is disposed in the sprayer and is configured to separate a refrigerant entering the sprayer through the evaporator inlet into a gas phase and a liquid phase.

According to another aspect of the present invention, a falling film evaporator is further provided. The falling film evaporator includes: a housing connected to a suction port of a compressor; the aforementioned distributor disposed at an upper part in the housing; and a heat exchange pipeline disposed in the housing and below the orifice plate of the distributor.

According to still another aspect of the present invention, a refrigerating system is further provided. The refrigerating system includes the aforementioned falling film evaporator.

DETAILED DESCRIPTION

Figure 1:
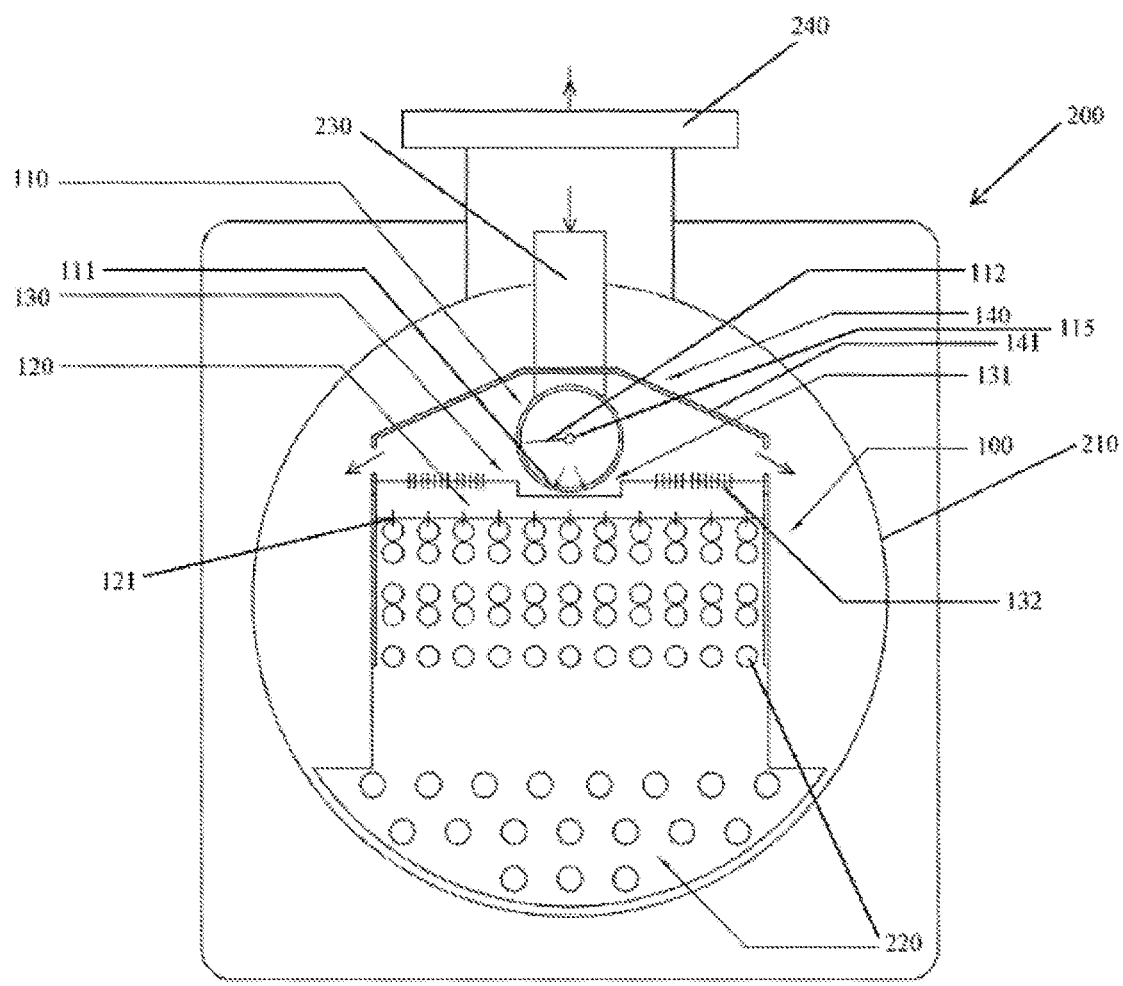
FIG. 1 is a schematic diagram of an end portion of a falling film evaporator according to an embodiment of the present invention.
Figure 2:
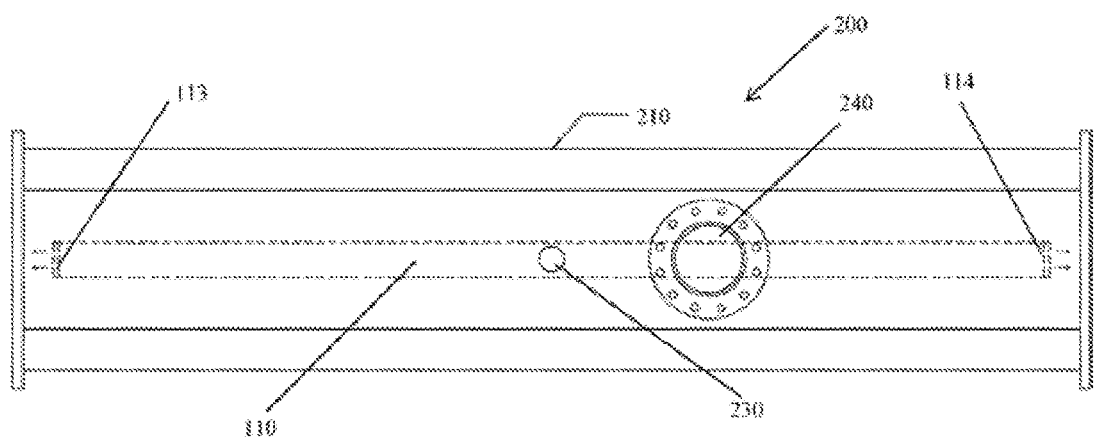
FIG. 2 is a schematic diagram of the top of a falling film evaporator according to an embodiment of the present invention.

FIG. 1 and FIG. 2 show an embodiment of a falling film evaporator according to the present invention, and an embodiment of a distributor is also shown in the falling film evaporator. The falling film evaporator 200 includes a housing 210 as well as a distributor 100 and a heat exchange pipeline 220 that are disposed from top to bottom in the housing 210. The housing 210 is further provided with an evaporator inlet 230 and an evaporator outlet 240. As in a conventional refrigerating system, the evaporator inlet 230 is connected to a condenser through a throttling element, and the evaporator outlet 240 is connected to a suction end of a compressor. In such an arrangement, after expansion and throttling by the throttling element, a two-phase refrigerant enters into the housing 210 of the falling film evaporator 200 from the evaporator inlet 230 and gas-liquid separation can be implemented in the distributor 100. After that, the separated gas-phase refrigerant flows out from the evaporator outlet 240 and is suctioned into the compressor for compression so as to participate in a new operating cycle. The liquid-phase refrigerant flows downward to have sufficient heat exchange with the heat exchange pipeline 220 and be evaporated, and then flows out from the evaporator outlet 240 and is suctioned into the compressor for compression so as to participate in a new operating cycle. In this process, the presence of the distributor effectively implements gas-liquid separation and uniform distribution of the liquid-phase refrigerant to the heat exchange pipeline. With reference to the embodiments in the accompanying drawings, the following description will focus on how the distributor implements or optimizes these functions.

Still refer to FIG. 1 and FIG. 2. The distributor 100 includes: a shield plate 140, a sprayer 110, a baffle plate 130 and an orifice plate 120 sequentially from top to bottom. The evaporator inlet 230 and the evaporator outlet 240 are both disposed above the shield plate 140. The evaporator inlet 230 penetrates through the shield plate 140 and is connected to the sprayer 110. The heat exchange pipeline is disposed below the orifice plate 120, so that the distributed liquid-phase refrigerant can exchange heat when flowing through the heat exchange pipeline. In such an arrangement, after expansion and throttling by the throttling element, a two-phase refrigerant enters into the housing 210 of the falling film evaporator 200 from the evaporator inlet 230 and enters into the sprayer 110 of the distributor 100, and gas-liquid separation can be implemented in the sprayer 110. After that, on one hand, the separated liquid-phase refrigerant flows downward from the sprayer 110 to the baffle plate 130 to achieve a liquid equalizing effect on the baffle plate 130, and then flows from the baffle plate to the orifice plate 120. The liquid-phase refrigerant flows downward to the heat exchange pipeline 220 only after being uniformly distributed by the orifice plate 120. After sufficient heat exchange with the heat exchange pipeline 220 and evaporation, the refrigerant then flows out from the evaporator outlet 240 and is suctioned into the compressor for compression so as to participate in a new operating cycle. On the other hand, the separated gas-phase refrigerant flows out from gaps on two sides of the shield plate 140 to the two sides, then rises to enter into the evaporator outlet 240, and is suctioned into the compressor for compression so as to participate in a new operating cycle. Such settings effectively implement gas-liquid separation of the two-phase refrigerant entering the evaporator and uniform distribution of the liquid-phase refrigerant to the heat exchange pipeline.

It should be noted that the foregoing embodiment is merely a preferred embodiment provided by the applicant after verification for multiple times. In consideration of the manufacturing costs or relatively low performance requirements, technical effects brought about by a part of the settings can also be omitted for higher cost-effectiveness. For example, in an embodiment, the distributor can only include a sprayer and an orifice plate, which can also achieve a desirable gas-liquid separation effect for the refrigerant. For another example, in an embodiment, the distributor can only include a sprayer, a baffle plate and an orifice plate, which can also achieve a desirable gas-liquid separation effect and flow equalizing effect for the refrigerant. For still another example, in an embodiment, the distributor can only include a sprayer, a shield plate and an orifice plate, which can also achieve a desirable gas-liquid separation effect for the refrigerant and an effect of preventing the liquid-phase refrigerant from being directly suctioned into the compressor. In addition to the examples above, many combination manners can also be implemented based on the conception of the present application, which are not enumerated here.

The elements of the distributor in this embodiment will be described in detail below with reference to the accompanying drawings.

Figure 3:
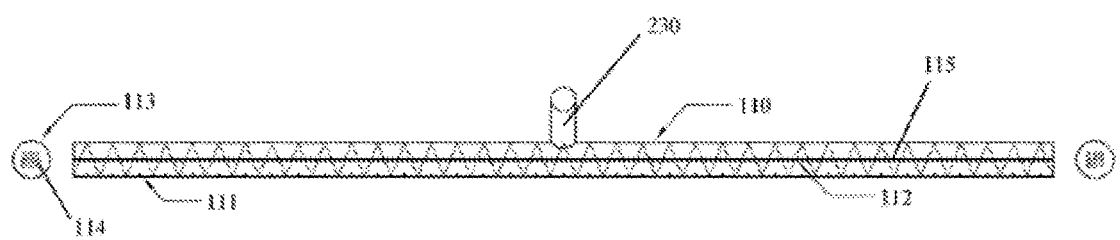
FIG. 3 is a schematic diagram of a sprayer of a distributor according to an embodiment of the present invention.
Figure 6:
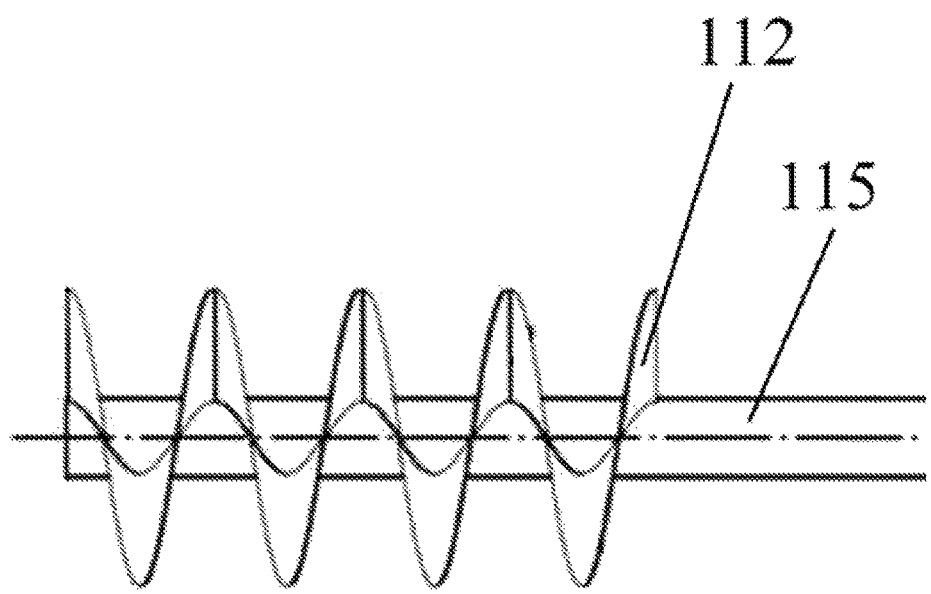
FIG. 6 is a schematic diagram of a spiral blade in a sprayer of a distributor according to an embodiment of the present invention.

Referring to FIG. 1 to FIG. 3, a sprayer 110 in a distributor 100 is shown. The top of the sprayer 110 is connected to a falling film evaporator inlet 230, and spray holes 111 are provided at the bottom of the sprayer 110. A centrifugal gas-liquid separating element is disposed in the sprayer 110 and is configured to separate a refrigerant entering the sprayer 110 through the evaporator inlet 230 into a gas phase and a liquid phase. In such an arrangement, the two-phase refrigerant entering the sprayer 110 through the evaporator inlet 230 can be better separated under dual effects of the gravity and the centrifugal force. Many types of centrifugal gas-liquid separating elements can be acquired in combination with existing centrifugal structures. The working principle will be illustrated by using one type of centrifugal gas-liquid separating element as an example. For example, referring to FIG. 6, the centrifugal gas-liquid separating element is set as a spiral blade 112, and a supporting axle 115 that extends along a longitudinal direction to penetrate through the sprayer 110 is further disposed. The spiral blade 112 is supported by the supporting axle 115 and also extends along the longitudinal direction to penetrate through the sprayer 110. In this case, after entering the distributor from the middle section of the distributor, the two-phase refrigerant on one hand advances spirally along a channel surrounded by the spiral blade 112 and a tube wall of the sprayer 110, and gas-liquid separation is implemented in the centrifuging process. On the other hand, when the refrigerant flows through the bottom of each spiral section, a part of the refrigerant flows out through the spray hole 111 on the spiral section. The two-phase refrigerant can be fully separated under the combination of the foregoing two forms of motion.

In addition, end plates 113 can further be disposed at two ends of the sprayer 110. Each end plate 113 is provided with end through holes 114, so that the separated gas-phase refrigerant and liquid-phase refrigerant moving to the two ends can also flow out.

Optionally, the sprayer 110 can be constructed to be tubular. The spray holes 111 are provided at the bottom of the tubular sprayer 110 along the longitudinal direction. On one hand, the tubular structure is easy to process; on the other hand, the tubular structure also facilitates the centrifuging process. The spray holes are arranged along the longitudinal direction with reference to an actual direction of the centrifugal movement, thus providing more convenient communication ports for the refrigerant. In order to provide a relatively large communication space, two rows of the spray holes 111 can also be provided at the bottom of the tubular sprayer 110.

Figure 4:
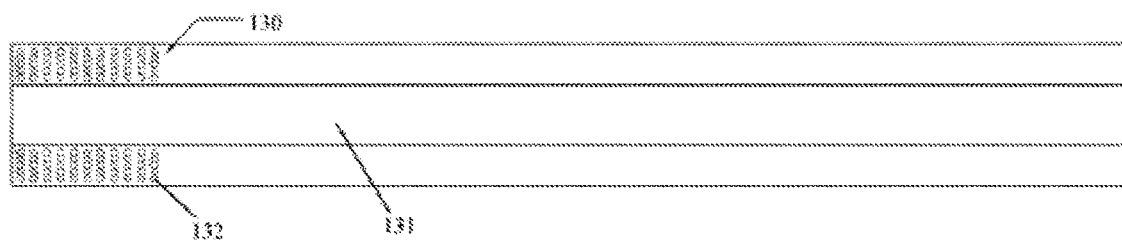
FIG. 4 is a schematic diagram of a baffle plate of a distributor according to an embodiment of the present invention.

Referring to FIG. 1, FIG. 2 and FIG. 4, a baffle plate 130 of the distributor 100 is shown. The baffle plate 130 is disposed between the sprayer 110 and the orifice plate 120 and is provided with a groove 131 for storing a refrigerant. The groove 131 is located below the spray holes 111. In such an arrangement, the liquid-phase refrigerant flowing out from the spray holes 111 of the sprayer 110 can enter into and be temporarily stored in the groove 131 on the baffle plate 130. The liquid-phase refrigerant can uniformly overflow from the groove to the orifice plate 120, thus preventing that the refrigerant flowing out from the spray holes 111 is not uniform enough and affects the subsequent distribution effect.

Optionally, the groove 131 is provided on the baffle plate 130 along the longitudinal direction so as to receive the refrigerant flowing out from the spray holes 111, thus achieving a better flow equalizing effect.

In addition, the baffle plate 130 further includes flow equalizing holes 132 provided on the baffle plate 130 on two sides of the groove 131 along the longitudinal direction. In this case, the refrigerant uniformly overflowing from the groove is equalized by the flow equalizing holes 132 again and then flows downward to the orifice plate 120, thereby achieving a better flow equalizing effect and also indirectly affecting the subsequent heat exchange effect. The uniformly arranged flow equalizing holes 132 are only shown on two sides of the groove 131 on the left in the figure, in order to simplify the schematic diagram and make the picture clearer. In fact, the flow equalizing holes are uniformly arranged on the entire baffle plate according to the text description above.

Figure 5:
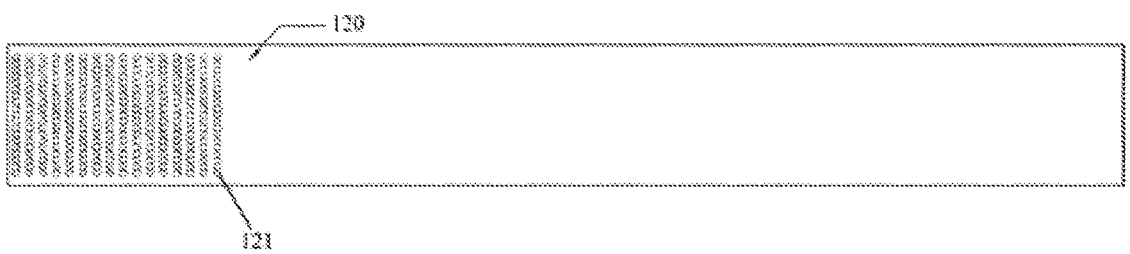
FIG. 5 is a schematic diagram of an orifice plate of a distributor according to an embodiment of the present invention.

Referring to FIG. 1, FIG. 2 and FIG. 5, an orifice plate 120 in the distributor 100 is shown. The orifice plate 120 is disposed at a lower end of the baffle plate 130 and is provided with multiple distribution holes 121. As such, the refrigerant flowing downward from the flow equalizing holes 132 on the baffle plate 130 can be received and be distributed through the distribution holes 121, so that the refrigerant is sprayed over the underneath heat exchange pipeline more evenly to implement sufficient heat exchange. The uniformly arranged distribution holes 121 are only shown on the left in the figure, in order to simplify the schematic diagram and make the picture clearer. In fact, the distribution holes are uniformly arranged on the entire orifice plate according to the text description above.

Referring to FIG. 1, a shield plate 140 of the distributor 100 is further shown. The shield plate 140 is disposed above the sprayer 110 and covers the orifice plate 120 in a vertical direction. In this case, the liquid-phase refrigerant after the gas-liquid separation can be prevented from being directly suctioned into the compressor under a huge negative pressure. Optionally, the shield plate 140 is set to have a flange 141 that is high in the middle and low on two sides along a horizontal direction. In this case, the separated gas-phase refrigerant can first flow towards two sides and then enters into the suction end of the compressor, while the liquid-phase refrigerant can also have sufficient time to fall onto the baffle plate. Therefore, it is better prevented that the liquid-phase refrigerant is directly suctioned into the compressor under a huge negative pressure.

As an application scenario of the falling film evaporator, an embodiment of a refrigerating system is further provided here. The falling film evaporator in any of the foregoing embodiments is applied to the refrigerating system, and therefore can also achieve the corresponding technical effects and improve the refrigeration performance of the system. Details are not described here again.

The foregoing examples mainly illustrate the distributor, the falling film evaporator and the refrigerating system of the present invention. Although only some implementation manners of present invention are described, those of ordinary skill in the art can understand that the present invention can be implemented in many other forms without departing from the purport and scope of the present invention. Therefore, the shown examples and implementation manners are regarded as illustrative rather than restrictive, and the present invention can cover various modifications and replacements without departing from the principle and scope of the present invention as defined in the appended claims.

The invention claimed is:

1. A distributor, comprising:
   a sprayer, the top of the sprayer being connected to a falling film evaporator inlet, and the bottom of the sprayer being provided with spray holes; and
   an orifice plate disposed at a lower end of the sprayer and provided with multiple distribution holes;
   wherein a centrifugal gas-liquid separating element is disposed in the sprayer and is configured to separate a refrigerant entering the sprayer through the evaporator inlet into a gas phase and a liquid phase;
   wherein end plates are disposed on two ends of the sprayer, and each end plate is provided with end through holes.

2. The distributor according to claim 1, further comprising a baffle plate, wherein the baffle plate is disposed between the sprayer and the orifice plate, a groove for storing a refrigerant is provided on the baffle plate, and the groove is located below the spray holes.

3. The distributor according to claim 2, wherein the groove is provided on the baffle plate along a longitudinal direction.

4. The distributor according to claim 3, wherein the baffle plate further comprises flow equalizing holes provided on two sides of the groove along the longitudinal direction.

5. The distributor according to claim 1, further comprising a shield plate, wherein the shield plate is disposed above the sprayer and covers the orifice plate in a vertical direction.

6. The distributor according to claim 5, wherein the shield plate further comprises a flange that is disposed along a horizontal direction and is high in the middle and low on two sides.

7. The distributor according to claim 1, wherein the centrifugal gas-liquid separating element is set as a spiral blade, and the spiral blade extends along the longitudinal direction to penetrate through the sprayer.

8. The distributor according to claim 7, further comprising a supporting axle that extends along the longitudinal direction to penetrate through the sprayer, and the spiral blade is supported on the supporting axle.

9. The distributor according to claim 1, wherein the sprayer is constructed to be tubular, and the spray holes are provided at the bottom of the tubular sprayer along the longitudinal direction.

10. The distributor according to claim 9, wherein two rows of the spray holes are provided at the bottom of the tubular sprayer.

11. A falling film evaporator, comprising:
    a housing connected to a suction port of a compressor;
    the distributor according to claim 1, which is disposed at an upper part in the housing; and
    a heat exchange pipeline disposed in the housing and below the orifice plate of the distributor.

12. A refrigerating system, comprising the falling film evaporator according to claim 11.

* * * * *